United States Patent [19]

Reischl et al.

[11] 4,119,613

[45] Oct. 10, 1978

[54] PROCESS FOR THE PRODUCTION OF POLYISOCYANATE-POLYADDITION PRODUCTS USING A MULTI-PHASE REACTION FLOW TUBE

[75] Inventors: Artur Reischl, Leverkusen; Henning Klussmann, Rommerskirchen; Eugen Velker, Dormagen, all of Germany

[73] Assignee: Bayer Aktiengesellschaft, Leverkusen, Germany

[21] Appl. No.: 829,383

[22] Filed: Aug. 31, 1977

[30] Foreign Application Priority Data

May 4, 1977 [DE] Fed. Rep. of Germany ....... 2719970

[51] Int. Cl.² .............................................. C08G 18/08
[52] U.S. Cl. ........................................ 526/64; 528/80; 528/83; 528/65; 528/61
[58] Field of Search .................... 260/75 NE, 77.5 AA

[56] References Cited

U.S. PATENT DOCUMENTS

| | | | |
|---|---|---|---|
| 2,737,479 | 3/1956 | Nicholson | 196/55 |
| 2,857,144 | 10/1958 | Gurley et al. | 260/75 NE |
| 3,183,112 | 5/1965 | Gemassmer | 260/75 NE |
| 3,233,025 | 2/1966 | Frye et al. | 260/75 NE |
| 3,550,669 | 12/1970 | Lippert et al. | 159/6 R |
| 3,620,680 | 11/1971 | Bartel et al. | 260/75 NE |
| 3,674,720 | 7/1972 | Dunn | 260/75 NE |
| 3,834,441 | 9/1974 | Vernaleken et al. | 159/49 |
| 3,894,994 | 7/1975 | Day et al. | 260/75 NE |

*Primary Examiner*—M. J. Welsh
*Attorney, Agent, or Firm*—Gene Harsh; Joseph C. Gil; William E. Parry

[57] ABSTRACT

This invention relates to a continuous process for the production of polyisocyanate polyaddition products using a multi-phase reaction flow tube as reactor.

11 Claims, No Drawings

PROCESS FOR THE PRODUCTION OF POLYISOCYANATE-POLYADDITION PRODUCTS USING A MULTI-PHASE REACTION FLOW TUBE

In the present state of the art, noncellular polyurethane plastics are generally produced in a stirrer-equipped vessel. The starting components and, optionally, a suitable solvent are introduced into the stirrer-equipped vessel at various points thereof and brought into contact with one another by circulating the mixture by means of rotating elements. The heat of reaction is dissipated through the walls of the vessel. Unfortunately, this process is attended by disadvantages attributable to the long transport paths within the reaction mixture, the uneven treatment of the product, the wide residence-time spectrum, the poor heat and mass exchange, the high investment costs and the unreliability of mechanical stirrers.

Processes for the continuous production of polyurethanes are also known. Thus, DOS No. 2,059,570, for example, describes a continuous single-stage process for the production of thermoplastic polyurethanes in screw extruders, in which:

(a) a diisocyanate, a relatively high molecular weight polyhydroxyl compound, a chain-extender and a catalyst are mixed in a first zone of the screw extruder;

(b) the reaction mixture is then passed through a second zone in which it is mixed under the action of intense shear forces; and (c) finally, the reaction mixture is continuously transferred to a forming zone in which it is formed by extrusion.

It has been found that homogeneous products free from nodules and jelly-fish cannot be obtained by the process according to DOS No. 2,059,570. Although this difficulty may be obviated by installing intensively mixing kneading elements at certain points of the screw extruder in accordance with DOS No. 2,302,564, the position of these kneading elements is specific to each product and has to be redetermined every time the formulation is changed. However, disadvantages of producing polyurethanes in screw extruders are, in every case, the relatively high investment costs involved, the fact that it is only possible to use highly viscous products, the rotating machine parts and the small reaction volume available. In addition, the frictional heat generated by the screws gives rise to problems because it has to be dissipated in addition to the heat of reaction.

It has now surprisingly been found that polyisocyanate-polyaddition products may be continuously produced in tubular coil evaporators in the presence of water and/or organic solvents or dispersants and optionally in the presence of inert carrier gases. Tubular coil evaporators are described, for example, in DAS Nos. 1,667,051 and 1,921,045 corresponding to U.S. Pat. Nos. 3,550,669 and 3,834,441, as suitable apparatus for the concentration of solutions of solids by evaporation and for removing readily volatile constituents from mixtures of substances. However, the use of tubular coil evaporators for carrying out polymerisation reactions is neither described nor suggested in the above-mentioned Auslegeschrifts.

It has been found that evaporators of the type in question are also eminently suitable for use as reactors for continuous polyisocyanate-polyaddition reactions under mild conditions and with high volume/time yields. The tubular coil evaporator used as reaction tube in accordance with the present invention consists of a coiled, descending tube which may be heated or even cooled in sections and into which the starting products are fed from above. Under the action of the heat of reaction liberated, the mixture becomes heated and begins to boil in the tube depending upon the pressure applied (10 mbars to 100 bars, preferably 100 mbars to 10 bars). The evaporating solvents or dispersants keep the mixture at the reaction temperature and also serve, together with the inert gas used, if any, as carrier gas for transporting and mixing the reaction mixture. As a result of the polyaddition reaction and the simultaneous evaporation of the solvent or dispersant, the reaction mixture becomes concentrated as it flows downwards through the tube and finally changes into a polymer melt (or at lower process temperatures into a polymer powder).

The present invention relates to a continuous process for the production of polyisocyanate-polyaddition products by reacting polyisocyanates with compounds containing at least two isocyanate-reactive groups in the presence of water and/or organic solvents or dispersants and/or inert carrier gases and, optionally, catalysts, wherein the liquid mixture of the starting components or a solution or dispersion of the starting components in the solvent or dispersant used, is introduced, optionally together with an inert carrier gas, into a coiled flow tube having an internal tube diameter of from 3 to 100 mm, preferably from 8 to 70 mm, a ratio of tube diameter to tube length of from 1:100 to 1:3000, preferably from 1:400 to 1:1500, and a ratio of tube diameter to coil diameter of from 1:5 to 1:100, preferably from 1:10 to 1:40, the fall in pressure over the length of the reaction tube amounting to from 10 mbars to 100 bars, preferably from 100 mbars to 20 bars, the quantitative ratios of starting components, solvents or dispersants and inert carrier gas being selected in such a way that the proportion of the total gas phase in the reaction tube amounts to from 10 to 90%, by weight, preferably from 20 to 70% by weight, the rate of gas flow in the tube amounts to from 20 to 300 m/seconds and the average residence time of the reactants in the tube amounts to less than 5 minutes, preferably to less than 2 minutes, and the heat of reaction generated being directly dissipated through the tube jacket which is coolable or heatable in sections, so that the reaction temperature is from 20° to 250° C., preferably from 50° to 230° C. and, with particular preference, from 60° to 200° C., after which the solid and/or liquid reaction product and the inert carrier gas and/or vapour-form solvent or dispersant are removed at the end of the reaction tube.

In the process according to the present invention, there is developed within the reaction tube (hereinafter referred to as a "multiphase flow tube") a closed, thin-layer ring flow of the liquid reaction mixture which, by suitable temperature control, is preferably maintained within a viscosity range of from 10 to 10,000 P and, with particular preference, from 50 to 3000P, a circular flow being imparted by the gas stream to this ring flow between the surface of the liquid and the wall of the tube. The gas stream consists both of the inert gas used, if any, and of the evaporating solvent and/or dispersant. The total percentage, by weight, of this gas mixture in the reaction tube should amount to from 10 to 90%, by weight, preferably from 20 to 70%, by weight, which may readily be obtained by varying the mixing ratio of the various starting components.

The advantage of the process according to the present invention lies in the fact that the thin-layer ring flow formed in the reaction mixture under the effect of the centrifugal forces in the coiled multi-phase flow tube remains intact in the reaction mixture over the entire length of the tube, the circular flow circulating transversely thereof between the wall of the tube and the surface of the liquid additionally providing for intensive mixing of the reaction components, for the rapid evaporation of volatile constituents and for an extremely rapid heat exchange through the wall of the tube and the gas stream, so that the reaction may take place under optimum conditions. It is possible in this way to obtain very high throughputs without the products being damaged in any way.

It must be regarded as surprising that liquids having a viscosity of up to 10,000 P may be moved though a long tube solely by a gas stream, i.e without any need for expensive mechanical conveyor means, in such a way that, on the one hand, no caking occurs, which could give rise to product damage caused by overheating, and, on the other hand, the thin liquid layer does not break up. Under the effect of the centrifugal forces, the liquid reaction mixture is permanently driven outwards. Another advantage is that no back-mixing occurs so that by virtue of a narrow residence time spectrum, i.e. a uniform passage of the reaction mixture through the multiphase flow tube, a high quality of the end product is obtained.

The apparatus required for carrying out the process according to the present invention is compact and simple in structure. By virtue of the absence of rotating parts in the product stream, the multiphase flow tube is highly reliable in operation.

In one particular embodiment of the process according to the present invention, the individual starting components are fed into the multiphase flow tube at various points thereof. By thus introducing the reaction components and, optionally, catalysts and/or tempered carrier gases into the gas stream through passages arranged at various points of the tube, it is possible to influence the course of the reaction and also pressure, temperature and throughflow rate in sections. By aerodynamically designing the passages leading through the walls of the tube, the ring flow is prevented from breaking up at the various inlets.

Starting components suitable for the production of polyurethane plastics include, aliphatic, cycloaliphatic, araliphatic, aromatic and heterocyclic polyisocyanates of the type described, for example, by W. Siefken in Justus Liebigs Annalen der Chemie, 562, pages 75 to 136, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate, also mixtures of these isomers, 1-isocyanato-3,3,5-trimethyl-5-isocyanatomethyl cyclohexane (DAS No. 1,202,785, U.S. Pat. No. 3,401,190), 2,4- and 2,6-hexahydrotolylene diisocyanate, also mixtures of these isomers, hexahydro-1,3- and/or 1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate, also mixtures of these isomers, diphenyl methane-2,4'- and/or -4,4'-diisocyanate, naphthylene-1,5-diisocyanate, triphenyl methane-4,4', 4''-triisocyanate, polyphenyl polymethylene polyisocyanates, of the type which may be obtained by condensing aniline with formaldehyde, followed by phosgenation, and which are described for example, in British Pat. Nos. 874,430 and 848,671, m- and p-isocyanatophenyl sulphonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups of the type described in German Pat. No. 1,092,007 (U.S. Pat. No. 3,152,162), diisocyanates of the type described in U.S. Pat. No. 3,492,330, polyisocyanates containing allophanate groups of the type described, for example, in British Pat. No. 994,890, Belgian Pat. No. 761,626 and published Dutch Patent Application No. 7,102,524, polyisocyanates containing isocyanurate groups of the type described, for example, in U.S. Pat. No. 3,001,973, German Pat. Nos. 1,022,789; 1,222,067 and 1,027,394 and in German Offenlegungsschrift Nos. 1,929,034 and 2,004,048, polyisocyanates containing urethane groups of the type described, for example, in Belgian Pat. No. 752,261 or in U.S. Pat. No. 3,394,164, polyisocyanates containing acylated urea groups according to German Pat. No. 1,230,778, polyisocyanates containing biuret groups of the type described, for example, in German Pat. No. 1,101,394 (U.S. Pat. Nos. 3,124,605 and 3,201,372) and in British Pat. No. 889,050, polyisocyanates obtained by telomerisation reactions of the type described, for example, in U.S. Pat. No. 3,654,106, polyisocyanates containing ester groups of the type described, for example, in British Pat. Nos. 965,474 and 1,072,956, in U.S. Pat. No. 3,567,763 and in German Pat. No. 1,231,688, also reaction products of the above-mentioned isocyanates with acetals according to German Pat. No. 1,072,385 and polyisocyanates containing polymeric fatty acid radicals according to U.S. Pat. No. 3,455,883.

It is also possible to use the isocyanate group-containing distillation residues accumulating in the production of isocyanates on a commercial scale, optionally in solution in one or more of the aforementioned polyisocyanates. It is also possible to use mixtures of the aforementioned polyisocyanates.

In general, it is particularly preferred to use the commercially readily available polyisocyanates, for example 2,4- and 2,6-tolylene diisocyanate, also mixtures of these isomers ("TDI"), polyphenyl polymethylene polyisocyanates of the type obtained by condensing aniline with formaldehyde, followed by phosgenation ("crude MDI") and polyisocyanates containing carbodiimide groups, urethane groups, allophanate groups, isocyanurate groups, urea groups or biuret groups ("modified polyisocyanates").

Other starting components which may be used in accordance with the present invention are compounds containing at least two isocyanate-reactive hydrogen atoms and generally having a molecular weight of from 400 to 10,000. In addition to compounds containing amino groups, thiol groups or carboxyl groups, compounds of this type are preferably polyhydroxyl compounds, more especially compounds containing from two to eight hydroxyl groups, particularly those having molecular weights of from 800 to 10,000, preferably from 1000 to 6000, for example polyesters, polyethers, polythioethers, polyacetals, polycarbonates, and polyester amides containing at least two, generally from 2 to 8, but preferably from 2 to 4 hydroxyl groups, of the type commonly used for the production of homogeneous and cellular polyurethanes.

Examples of suitable polyesters containing hydroxyl groups are reaction products of polyhydric, preferably dihydric, and, optionally, trihydric, alcohols with polybasic, preferably dibasic, carboxylic acids. Instead of the free polycarboxylic acids, the corresponding polycarboxylic acid anhydrides or corresponding polycarboxylic acid esters of lower alcohols or mixtures thereof may also be used for the production of the polyesters. The polycarboxylic acids may be aliphatic, cycloaliphatic, aromatic and/or heterocyclic, and may optionally be substituted, for example by halogen atoms, and/or may be unsaturated.

Examples of these polycarboxylic acids are: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid-bis-glycol ester. Examples of suitable polyhydric alcohols are: ethylene glycol, 1,2- and 1,3-propylene glycol, 1,4-and 2,3-butylene glycol, 1,6-hexane diol, 1,8-octane diol, neopentyl glycol, cyclohexane dimethanol (1,4-bis-hydroxymethylcyclohexane), 2-methyl-1,3-propane diol, glycerol, trimethylol propane, 1,2,6-hexane triol, 1,2,4-butane triol, trimethylol ethane, pentaerythritol, quinitol, mannitol, sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example $\epsilon$-caprolactone, or hydroxy carboxylic acids, for example $\omega$-hydroxy caproic acid, may also be used.

The polyethers containing at least two, generally from 2 to 8, preferably 2 or 3, hydroxyl groups which are used in accordance with the present invention are also known and are obtained, for example, by polymerising epoxides, such as ethylene oxide, propylene oxide, butylene oxide, tetrahydrofuran, styrene oxide or epichlorohydrin on their own, for example in the presence of $BF_3$, or by adding these epoxides, optionally in admixture or successively, with starter components containing reactive hydrogen atoms, such as water, ammonia, alcohols, or amines, for example ethylene glycol, 1,3- or 1,2-propylene glycol, trimethylol propane, 4,4'-dihydroxy diphenyl propane, aniline, ethanolamine or ethylene diamine. Sucrose polyethers of the type described, for example, in German Auslegeschrift Nos. 1,176,358 and 1,064,938, may also be used in accordance with the present invention. In many cases, it is preferred to use polyethers which predominantly contain primary OH-groups (up to 90%, by weight, based on all the OH-groups present in the polyether). Polyethers modified by vinyl polymers, of the type obtained, for example, by polymerising styrene and acrylonitrile in the presence of polyethers (U.S. Pat. Nos. 3,383,351; 3,304,273; 3,523,093 and 3,110,695; German Pat. No. 1,152,536) are also suitable, as are polybutadienes containing OH-groups.

Among the polythioethers, particular reference is made to the condensation products of thiodiglycol on its own and/or with other glycols, dicarboxylic acids, formaldehyde, amino-carboxylic acids or amino alcohols. Depending upon the co-components, these products are polythio mixed ethers, polythioether esters or polytioether ester amides.

Suitable polyacetals are, for example, those compounds which may be obtained from the reaction of glycols, such as diethylene glycol, triethylene glycol, 4,4'-dioxethoxy diphenyl dimethyl methane and hexane diol, with formaldehyde. Polyacetals suitable for the purposes of the present invention may also be obtained by polymerising cyclic acetals.

Suitable polycarbonates containing hydroxyl groups are those known compounds obtainable, for example, by reacting diols, such as 1,3-propane diol, 1,4-butane diol and/or 1,6-hexane diol, diethylene glycol, triethylene glycol or tetraethylene glycol, with diaryl carbonates, for example diphenyl carbonate, or with phosgene.

Examples of the polyester amides and polyamides are the predominantly linear condensates obtained from polybasic, saturated and unsaturated carboxylic acids and the anhydrides thereof and polyfunctional saturated and unsaturated amino alcohols, diamines, polyamines and mixtures thereof.

Polyhydroxyl compounds already containing urethane or urea groups and optionally modified natural polyols, such as castor oil, carbohydrates, starch, may also be used. Addition products of alkylene oxides with phenol-formaldehyde resins or even with urea-formaldehyde resins may also be used in accordance with the present invention.

Representatives of these compounds used in accordance with the present invention are described, for example, in High Polymers, Vol.XVI, "Polyurethanes, Chemistry and Technology", by Saunders-Frisch, Interscience Publishers, New York, London, Vol. I, 1962, pages 32 to 42 and pages 44 to 54, and Vol. II, 1964, pages 5–6 and 198–199, and in Kunststoff-Handbuch, Vol. VII, Vieweg-Hochtlen, Carl Hanser-Verlag, Munich, 1966, for example on pages 45 to 71.

It is, of course, also possible to use mixtures of the above-mentioned compounds containing at least two isocyanate-reactive hydrogen atoms and having a molecular weight of from 400 to 10,000, for example mixtures of polyethers and polyesters.

In addition to water, other starting components which may be used in accordance with the present invention for the polyisocyanate-polyaddition reaction are compounds containing at least two isocyanate-reactive hydrogen atoms and having a molecular weight of from 32 to 400. In this case, too, the compounds in question are compounds containing hydroxyl groups and/or amino groups and/or thiol groups and/or carboxyl groups, preferably compounds containing hydroxyl groups and/or amino groups which are used as chain-extenders or cross-linkers. These compounds generally contain from 2 to 8 isocyanate-reactive hydrogen atoms, preferably 2 or 3 reactive hydrogen atoms.

Examples of such compounds are: ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, trimethylol ethane, pentaerythritol, quinitol, mannitol, sorbitol, diethylene glcyol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, 4,4'-dihydroxy diphenyl propane, dihydroxy methyl hydroquinone, ethanolamine, diethanolamine, triethanolamine, 3-aminopropanol, ethylene diamine, 1,3-diaminopropane, 1-mercapto-3-aminopropane, 4-hydroxy- or -amino-phthalic acid, succinic acid, adipic acid, hydrazine, N,N'-dimethyl hydrazine, 4,4'-diaminodiphenyl methane, tolylene diamine, methylene-bis-chloraniline, methylene-bis-anthranalic acid ester, diaminobenzoic acid esters and the isomeric chlorophenylene diamines.

In this case, too, it is possible to use mixtures of different compounds containing at least two isocyanate-reactive hydrogen atoms and having a molecular weight of from 32 to 400.

It is, of course, also possible in accordance with the present invention to use compounds which contain ionic groups or groups capable of salt formation and which are known for the production of ionic polyurethane dispersions. Such compounds are described in detail, for example, in DOS No. 2,550,797.

However, it is also possible in accordance with the present invention to use polyhydroxyl compounds containing high molecular weight polyadducts or polycondensates in finely disperse or dissolved form. Such modified polyhydroxyl compounds are obtained by carrying out polyaddition reactions (for example reactions between polyisocyanates and aminofunctional compounds) or polycondensation reactions (for example between formaldehyde and phenols and/or amines) directly in situ in the above-mentioned compounds containing hydroxyl groups. Such processes are described, for example, in German Auslegeschrift Nos. 1,168,075 and 1,260,142 and in German Offenlegungsschrift Nos. 2,324,134; 2,423,984; 2,512,385; 2,513,815; 2,550,796; 2,550,797; 2,550,833 and 2,550,862. However, it is also possible, in accordance with U.S. Pat. No. 3,869,413 or German Offenlegungsschrift No. 2,550,860, to mix an aqueous polymer dispersion with a polyhydroxyl compound and subsequently to remove the water from the mixture.

In cases where modified polyhydroxyl compounds of the type mentioned above are used as starting component in the polyisocyanate-polyaddition process, polyurethane plastics having considerably improved mechanical properties are formed in many cases.

According to the present invention, catalysts are also frequently used. Examples of suitable known catalysts are, for example tertiary amines, such as triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethyl aminoethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butane diamine, N,N-dimethyl-β-phenyl ethylamine, 1,2-dimethyl imidazole and 2-methyl imidazole. Other suitable catalysts are known Mannich bases of secondary amines, such as dimethylamine, and aldehydes, preferably formaldehyde, or ketones, such as acetone, methylethyl ketone or cyclohexanone, and phenols, such as phenol, nonylphenol or bis-phenol.

Examples of tertiary amine catalysts containing isocyanate-reactive hydrogen atoms are: triethanolamine, triisopropanol-amine, N-methyl dietnaolamine, N-ethyl diethanolamine, N,N-dimethyl ethanolamine, also the reaction products thereof with alkylene oxides, such as propylene oxide and/or ethylene oxide.

Other suitable catalysts are silaamines having carbon-silicon bonds of the type described, for example, in German Pat. No. 1,229,290 (corresponding to U.S. Pat. No. 3,620,984), for example 2,2,4-trimethyl-2-silamorpholine and 1,3-diethyl aminomethyl tetramethyl disiloxane.

Other suitable catalysts are nitrogen-containing bases, such as tetraalkyl ammonium hydroxides, also alkali metal hydroxides, such as sodium hydroxide, alkali metal phenolates, such as sodium phenolate, or alkali metal alcoholates, such as sodium methylate. Hexahydrotriazines may also be used as catalysts.

According to the present invention, organo-metallic compounds, especially organotin compounds, may also be used as catalysts.

Preferred organotin compounds are tin(II)salts of carboxylic acids, such as tin(II)acetate, tin(II)octoate, tin(II)ethyl hexoate and tin(II)laurate, and the tin(IV) compounds, for example dibutyl tin oxide, dibutyl tin dichloride, dibutyl tin diacetate, dibutyl tin dilaurate, dibutyl tin maleate or dioctyl tin diacetate. It is, of course, possible to use the above-mentioned catalysts in the form of mixtures.

Further representatives of catalysts suitable for use in accordance with the present invention and details on the way in which the catalysts work may be found in Kunststoff-Handbuch, Vol. VII, by Vieweg and Hochtlen, Carl-Hanser-Verlag, Munich, 1966, for example on pages 96 to 102.

The catalysts are generally used in quantities of from about 0.0001 to 10%, by weight, preferably from 0.001 to 1%, by weight, based on the reaction mixture without solvent or dispersant.

According to the present invention, it is possible to use reaction retarders, for example substances which are acid in reaction, such as hydrochloric acid or organic acid halides, also pigments or dyes, known flameproofing agents, for example trischlorethyl phosphate, tricresyl phosphate or ammonium phosphate and polyphosphate, stabilisers against the effects of ageing and weather, plasticisers, substances having fungistatic and bacteriostatic effects and fillers, such as barium sulphate, kieselguhr, carbon black or prepared chalk.

According to the present invention, suitable solvents or dispersants for the starting components of the polyisocyanate-polyaddition reaction include both water (which also participates to an extent in the polyaddition reaction) and also a variety of different inert organic solvents having boiling points of from 30° to 250° C., preferably from 40° to 180° C., for example ketones, such as acetone, methylethyl ketone and cyclohexanone, aliphatic and aromatic hydrocarbons, such as a number of different hydrocarbon fractions having boiling points in the above-mentioned temperature range, pentane, hexane, benzene, toluene and xylene, ethers, such as diethyl ether, diisopropyl ether, dioxane, tetrahydrofuran, ethylene glycol dimethyl ether or diethylene glycol dimethyl ether, esters, such as ethyl acetate and ethylene glycol monomethyl ether acetate, chlorinated hydrocarbons, such as carbon tetrachloride, chlorobenzene and chlorotoluene, dimethyl sulphoxide and dimethyl formamide. According to the present invention, it is preferred to use toluene, methylethyl ketone, light petrol or water.

In one particular embodiment of the process according to the present invention, the dispersant used is one of the above-mentioned polyhydroxyl compounds or mixtures thereof, but preferably a polyether polyol. This is possible when substantially equivalent quantities of compounds having a greater reactivity to isocyanate groups than these polyols are used as reactants for the polyisocyanates. Preferred compounds of this type are hydrazine, substituted hydrazines and polyamines. In this case, finely divided stable dispersions of polyureas or polyhydrazodicarbonamides in the polyols as dispersants are obtained as reaction product. Since the polyols do not evaporate to any significant extend during the reaction, one of the above-mentioned volatile compounds (preferably water) and/or an inert carrier gas must, of course, be used in addition to the polyol serving as dispersant in this embodiment of the process according to the present invention. Suitable starting products for this "in situ" polyaddition reaction and further details of the products formed may be found in German Auslegeschrift Nos. 1,168,075 and 1,260,142 and in German Offenlegungsschrift Nos. 2,512,385; 2,513,815; 2,550,796; 2,550,797; 2,550,833 and 2,550,862.

According to the present invention, it is also possible to carry out a reaction with formaldehyde and compounds capable of forming aminoplasts and/or phenoplasts either at the same time as the polyisocyanate-polyaddition reaction or thereafter. In this case, mixed polyaddition/polycondensation products are obtained. Suitable starting components for this embodiment of the process according to the present invention and details on the way in which the reaction is carried out may be found in DOS No. 2,639,254.

In addition to nitrogen, suitable, optionally-used inert gases are, for example, carbon dioxide and the noble gases.

The process according to the present invention is variable within wide limits. It is possible, above all when the various compounds containing Zerewitinoff-active hydrogen atoms do not differ appreciably from one another in the reactivity thereof to isocyanates, to introduce a mixture of all the starting compounds into the multiphase flow tube together with the solvent or dispersant and the optionally-used carrier gas. However, it is also possible in accordance with the present invention to carry out the polyisocyanate-polyaddition reaction in several stages. For example, the reaction components may be premixed, for example in a stirrer-equipped vessel, pre-reacted up to a conversion of from 10 to 80%, preferably from 20 to 70%, and the reaction mixture subsequently introduced into the multiphase flow tube. It is also possible initially to react the polyisocyanates with only a portion of the compounds containing Zerewitinoff-active hydrogen atoms and to react the thus-obtained preadduct containing isocyanate groups with the remainder of the Zerewitinoff-active compounds. Conversely, it is, of course, also possible initially to introduce only a portion of the polyisocyanate and thus to produce, for example, a preadduct containing terminal hydroxyl groups which is then reacted with the remainder of the polyisocyanates to form a polymer.

The preliminary reation optionally carried out before the polyaddition reaction according to the present invention in the multiphase flow tube up to a conversion of from 10 to 80% may, of course, be carried out not only in batches in a stirrer-equipped vessel, but also continuously — after premixing of the reaction components, for example in a flow mixer — in an optionally heatable reaction tube (for example even in the form of a second multiphase flow tube) preceding the coiled flow tube.

However, the process according to the present invention is, of course, not limited to the production of polyaddition products of very high molecular weight. According to the present invention, it is also possible, for example, to produce substantially monomer-free prepolymers of the above-mentioned type containing isocyanate groups or hydroxyl groups, which is of particular interest for numerous technical applications. Accordingly, the equivalent ratio between isocyanate groups and Zerewitinoff-active hydrogen atoms may be varied within wide limits. It is generally from 0.5 to 3, preferably from 0.8 to 2 and, with particular preference, from 0.9 to 1.2.

As mentioned above, the reaction components may also be introduced into the multiphase flow tube at several points thereof in the process according to the present invention. It is possible in this way, for example, initially to synthesise an NCO-prepolymer from a polyisocyanate and a relatively high molecular weight polyhydroxyl compound in the first part of the tube and subsequently to react the thus-produced NCO-prepolymer into a high molecular weight polyurethane in the second part of the reaction flow tube by adding a low molecular weight chain-extender of the above-mentioned type. However, it is, of course, also possible to carry out prepolymer formation in a preliminary reaction, for example in a stirrer-equipped vessel, and only to carry out the chain-extending reaction, which may give rise to complications on account of the rapidly increasing viscosity of the reaction mixture in a stirrer-equipped vessel, in the multiphase flow tube. It is also possible to carry out the polyaddition reaction in the multiphase flow tube up to only a certain conversion and thereafter to stop the reaction in known manner by adding a chain-terminator which is monofunctional with respect to isocyanates (for example a monohydric alcohol or a monoamine).

The required product-specific temperature profile may be adjusted by heating or cooling the coiled multiphase flow tube in sections. The reaction temperature may vary within wide limits in the process according to the present invention. In general, the reaction is carried out at temperatures of from 20° to 250° C. In the chain-extending reaction with amino-functional compounds, the preferred temperature range is from 60° to 230° C., whereas the chain-extending reaction with diols is preferably carried out at temperatures of from 50° to 200° C. and, with particular preference, from 60° to 180° C. By the exact control of temperature which is possible in accordance with the present invention, it is possible to obtain a maximum yield and, at the same time, to avoid product damage caused by overheating.

In another embodiment of the process according to the present invention, the products obtained at the end of the multiphase flow tube are introduced into a following screw in which an after-reaction may optionally take place. In this following screw, the highly viscous reaction product is completely degassed, which may be of considerable advantage for the further processing of the polyisocyanate-polyaddition products.

The process according to the present invention is illustrated by the following Examples. Unless otherwise indicated, the quantities quoted represent parts, by weight, or %, by weight.

The stainless steel reaction tube used in Examples 1 to 12 had a length of 9 meters and an internal diameter of 14 mm and comprised 7 coils (coil diameter: 400 mm). The average residence time of the reaction mixture in the multiphase flow tube amounted to about 1 minute in each case.

EXAMPLE 1

In a stirrer-equipped vessel designed to withstand an excess pressure of 6 bars, 30 parts, by weight, of a polyester of adipic acid and 1,4-butane diol (hydroxyl number 52.2; acid number 0.6) and 0.48 part, by weight, of 1,4-butane diol are intensively mixed with 52.9 parts, by weight, of toluene, followed by the addition with stirring, at 120° C., of 4.84 parts, by weight, of molten diphenyl methane-4,4'-diisocyanate, corresponding to an NCO/OH-ratio of 0.996. In the stirrer-equipped vessel, the components react up to a conversion of from about 20 to 50%.

For a throughput of 30 kg/h, the 40% solution of the reaction components in toluene is delivered by a gear pump through a preheater, which heats the product to 190° C., under a pressure of 7 bars, to the multiphase flow tube where it initially expands in a throttle valve to 4 bars and is then passed through the coiled flow tube. In the flow tube, the reaction conversion is increased from 20% to 99.5% (equilibrium at 190° C.) and, at the same time, the toluene is evaporated from the reaction mixture which considerably accelerates the reaction. The flow tube is followed by a separator in which the toluene vapours are removed under a pressure of 150 Torr, whilst the polyurethane reaction product having a residual toluene content of from 0.1 to 0.5% is discharged by means of a wide-jawed gear pump.

Immediately after production of the polyurethane, a 15% solution of the reaction product in methylethyl ketone has a viscosity of 210 cP/20° C. After storage for 1 week, a final viscosity of 1110 cP/20° C. is measured.

EXAMPLE 2

In the same apparatus as described in Example 1, 30 parts by weight, of a polyester of adipic acid and 1,6-hexane diol (hydroxyl number 52.2; acid number 0.6) are intensively mixed in the stirrer-equipped vessel with 0.46 part, by weight, of 1,4-butane diol and 52.9 parts, by weight, of toluene, followed by the addition with stirring, at 120° C., of 4.84 parts, by weight, of molten diphenyl methane-4,4'-diisocyanate, corresponding to an NCO/OH-ratio of 0.996. The mixture is then reacted in the two-phase flow tube reactor to form the polyurethane in the same way as in Example 1. The direct reaction product has a viscosity of 230 cP/20° C. in the form of a 15% solution in methylethyl ketone. After storage for 1 week at room temperature, the final viscosity amounts to 1260 cP/20° C.

EXAMPLE 3

In the same apparatus as described in Example 1, 0.540 part, by weight, of 1,4-butane diol, 0.707 part, by weight, of 1,6-hexane diol and 56.8 parts, by weight, of diphenyl methane-4,4'-diisocyanate are added while stirring to 30 parts, by weight, of a polyester of adipic acid and 1,6-hexane diol (hydroxyl number 52.2; acid number 0.6). The mixture is then reacted in the multi-phase flow tube reactor to form the polyurethane in the same way as in Example 1. The direct reaction product has a viscosity of 270 cP/20° C. in the form of a 15% solution in methylethyl ketone. After storage for 1 week at room temperature, the final viscosity measures 1035 cP/20° C.

EXAMPLE 4

As in Example 1, 30 parts, by weight, of a polyester of adipic acid and 1,6-hexane diol (hydroxyl number 133.3; acid number 0.7) are intensively mixed at 80° C. with 54.4 parts, by weight, of toluene and 6.44 parts, by weight, of tolylene diisocyanate and with 0.012 part, by weight, of trimethylol propane and 0.0005 part, by weight, of iron(III)acetyl acetonate, corresponding to an NCO/OH-ratio of 0.996. The mixture is then reacted in the multi-phase flow tube reactor to form the polyurethane in the same way as in Example 1. The direct reaction product has a viscosity of 10350 cP/20° C. in the form of a 30% solution in ethyl acetate. After storage for 2 weeks at room temperature, the final viscosity amounts to 44,300 cP/20° C.

EXAMPLE 5

As in Example 1, 30 parts, by weight, of a polyester of adipic acid and 1,4-butane diol (hydroxyl number 52.2; acid number 0.6), 48.7 parts, by weight, of toluene, 0.012 part, by weight, of trimethylol propane, 0.0005 part, by weight, of iron(III)acetylacetonate and 2.45 parts, by weight, of tolylene diisocyanate are intensively mixed at 80° C., corresponding to an NCO/OH-ratio of 0.986. The mixture is then reacted in the two-phase flow tube reactor to form the polyurethane in the same way as in Example 1. A 15% solution in methyl-ethyl ketone prepared immediately after production of the polyurethane has a viscosity of 135 cP/20° C. After 2 weeks, the final viscosity measures 470 cP/20° C.

EXAMPLE 6

In a first step, a preadduct is prepared from 20 parts, by weight, of hexane diol polycarbonate (hydroxyl number 112.5; acid number 0.1), 20 parts, by weight, of polypropylene glycol ether (hydroxyl number 111.5; acid number 0.01), 9.4 parts, by weight, of tolylene diisocyanate, 0.016 part, by weight of trimethylol propane and 0.0006 part, by weight, of iron acetylacetonate by heating the mixture for 15 minutes at 120° C. After dilution with 49.4 parts, by weight, of toluene, the temperature is adjusted to 80° C. The mixture is then reacted to form the polyurethane in the same way as described in Example 1, 0.219 kg/h of 1,4-butane diol being additionally added as further reaction component in a pinned-disc mixer behind the preheater and the reaction mixture being introduced into the multiphase flow tube through a throttle valve. A 30% solution in ethyl acetate prepared immediately after production of the polyurethane has a viscosity of 5500 cP/20° C. After storage for 2 weeks at room temperature, the viscosity amounts to 39,800 cP/20° C.

EXAMPLE 7

In the same apparatus as described in Example 6, a preadduct is initially produced from 30 parts, by weight, of a polyester of adipic acid and 1,4-butane diol (hydroxyl number 52.2; acid number 0.6) and 9.17 parts, by weight, of molten diphenyl methane-4,4-diisocyanate by heating the mixture for 30 minutes at 95° C. After dilution with 58.8 parts, by weight, of toluene, the solution is maintained at a temperature of 80° C. The mixture is then reacted to form the polyurethane in the same way as in Example 6, 0.625 kg/h of 1,4-butane diol being introduced as further reaction component into the reaction mixture by means of a pinned disc mixer behind the preheater and the multiphase flow tube being heated using steam under a pressure of 28.0 bars. A 25% solution in dimethyl formamide prepared immediately after production of the polyurethane has a viscosity of 4950 cP/20° C. After storage for 2 weeks at room temperature, the viscosity measures 11,270 cP/20° C.

EXAMPLE 8

In the same apparatus as described in Example 1, a preadduct is produced from 67.03 parts, by weight, of a polyester of adipic acid and 1,4-butane diol (hydroxyl number 52.2; acid number 0.6), 3.06 parts, by weight, of a polydimethyl siloxane containing terminal methylol groups and having a hydroxyl number of 198.0 and 24.06 parts, by weight, of 1-isocyanato-3-isocyanatomethyl-3,5,5-trimethylcyclohexane by heating the mixture for 2.5 hours at 100° C. After dilution with 141.5 parts, by weight, of toluene, the solution is maintained at a temperature of 80° C. The mixture is then reacted to form the polyurethane in the same way as in Example 1, 1.49 kg/h of 1-amino-3-aminomethyl-3,5,5-trimethyl cyclohexane being additionally introduced as further reaction component into the reaction mixture in a pinned-disc mixer following the preheater and the reactor being heated using steam under a pressure of 25 bars. A 25% solution in toluene-isopropanol (1:1) prepared immediately after production of the reaction product has a viscosity of 6390 cP/20° C. After storage for 1 week at room temperature, the final viscosity amounts to 7250 cP/20° C.

EXAMPLE 9

As in Example 8, a preadduct is initially produced from 21 parts, by weight, of a polyester of adipic acid and 1,6-hexane diol (hydroxyl number 134.1; acid number 0.7) and 12.05 parts, by weight, of 1-isocyanato-3-isocyanatomethyl-3,5,5-trimethyl cyclohexane by heating the mixture for 2.5 hours at 100° C. After dilution with 77.1 parts, by weight, of toluene, the solution is maintained at a temperature of 80° C. The mixture is then reacted to form the polyurethane in the same way as in Example 1, 1.628 kg/h of 1-amino-3-aminomethyl-3,5,5-trimethyl cyclohexane being additionally introduced as further reaction component into the reaction mixture by means of a pinned disc mixer following the preheater and the reactor being heated by saturated steam under a pressure of 25 bars. A 25% solution in isopropanol-toluene-methyl glycol acetate (50:37:13) prepared immediately after production of the reaction product has a viscosity of 11340cP/20° C. After storage for 1 week at room temperature, the final viscosity amounts to 12950 cP/20° C.

EXAMPLE 10

As in Example 8, a preadduct containing hydroxyl groups is prepared from 39 parts, by weight, of a polyester of adipic acid and ethane diol (hydroxyl number 55.4; acid number 0.6), 0.0156 part, by weight, of trimethylol propane, 0.0006 part, by weight, of iron (III-)acetylacetonate and 3 parts, by weight, of tolylene diisocyanate by heating the mixture for 4 hours at 120° C. After dilution with 18.0 parts, by weight of toluene, the solution is maintained at a temperature of 80° C. The mixture is then reacted to form the polyurethane in the same way as described in Example 1, the throughput amounting to 15 kg/h and 10 kg/h of a 3.5% solution of tolylene diisocyanate in toluene being additionally introduced as further reaction component into the reaction product in a pinned disc mixer following the preheater. A 15% solution in methylethyl ketone prepared immediately after production of the polyurethane has a viscosity of 80 cP/20° C. After storage for 2 weeks at room temperature, the final viscosity amounts to 140 cP/20° C.

EXAMPLE 11

As in Example 8, a preadduct is prepared from 21 parts, by weight, of a polyester of adipic acid and 1,6-hexane diol (hydroxyl number 134.1; acid number 0.7) and 12.05 parts, by weight, of 1-isocyanato-3-isocyanatomethyl-3,5,5-trimethyl cyclohexane by heating the mixture for 3 hours at 100° C. After dilution with 61.1 parts, by weight, of carbon tetrachloride, the solution is maintained at a temperature of 70° C. The mixture is reacted to form a polyurethane-polyurea in the same way as in Example 1, 1.628 kg/h of 1-amino-3-aminomethyl-3,5,5-trimethyl cyclohexane being additionally introduced as further reaction component into the reaction mixture by means of a pinned disc mixer following the preheater and the reactor being heated using saturated steam under 25 bars pressure. A 25% solution in isopropanol-toluene-methyl glycol acetate (50:37:13) prepared immediately after the production of the reaction product has a viscosity of 10,190 cP/20° C. After storage for 1 week at room temperature, the final viscosity amounts to 13220 cP/20° C.

EXAMPLE 12

As in Example 8, a preadduct is prepared from 60 parts, by weight, of a polyester of adipic acid and 1,4-butane diol (hydroxyl number 52.2; acid number 0.6) and 18.34 parts, by weight, of molten diphenyl methane-4,4'-diisocyanate by heating the mixture for 30 minutes at 95° C. The mixture is reacted to form a polyurethane in the same way as in Example 1, the throughput amounting to 12 kg/h, 0.625 kg/h of 1,4-butane diol being additionally introduced into the reaction mixture in a pinned disc mixer following the preheater, the reactor being heated using saturated steam under a pressure of 28 bars and nitrogen being used as blowing agent. The nitrogen is delivered to the reactor through a throttle valve under an initial pressure of 10 bars. After leaving the reactor, the nitrogen is compressed and reintroduced into the reactor. A 25% solution in DMF prepared immediately after production of the reaction product has a viscosity of 5760 cP/20° C. After storage for 2 weeks at room temperature, the final viscosity amounts to 11890 cP/20° C.

A reaction tube having a diameter of 9 mm, a length of 6 meters and a coil diameter of 25 mm was used for the following Examples 13 to 16. The average residence time of the reaction mixture in the multiphase flow tube was less than 1 minute.

EXAMPLE 13

Continuous production of a polyhydrazodicarbonamide powder:

From three storage vessels B1, B2 and B3, the reaction components are continuously delivered, at room temperature to a flow mixer equipped with a pinned-disc stirrer (volume 40ml). 5.0 g/minute of hydrazine monohydrate are delivered from storage vessel B1, 17.4 g/minute of tolylene diisocyanate (80% 2,4-isomer; 20% 2,6-isomer) are delivered from storage vessel B2 and 82.4 g/minute of light petrol having a boiling range from 70° to 85° C. are delivered from storage vessel B3. The components are mixed in a flow mixer and delivered under an initial pressure of from 2 to 3 bars into the helically wound reaction flow tube which is accommodated in a silicone bath heated to 100° C. The reaction tube opens into an expansion vessel to which a vacuum of 10 Torr is applied. A large part of the organic dispersant actually evaporates during the polyaddition reaction, the rest evaporating during injection into the expansion vessel so that the polyhydrazodicarbonamide is quantitatively deposited in the vessel in the form of a finely divided white powder (melting point from 240° to 250° C).

A comparable result is obtained when water is used instead of light petrol as the dispersant and the silicone bath is maintained at a temperature of 110° C.

EXAMPLE 14

The reaction components are stored in two storage vessels B1 and B2. B1 contains a mixture of 10,000 parts of a trimethylol propane-started polyether of propylene oxide and ethylene oxide having an OH- number of 34 and containing approximately 80% of primary OH-groups, 612 parts, by weight, of hydrazine hydrate and 1380 parts, by weight, of water; storage vessel B2 contains 2113 parts, by weight, of the diisocyanate of Example 13. The delivery rate amounts to 119.9 g/minute from B1 and to 21.13 g/minute from B2. Accordingly, the total delivery rate amounts to 141.03 g per minute.

The mixture heated to 95° C. in B1 is coaxially combined (residence time approximately 1.3 seconds) with the diisocyanate from B2 maintained at 20° C. by means of a twin piston pump in a static mixer (diameter ¼ inch; 21 elements; volume approximately 3 ml) and delivered into the reaction tube under an initial pressure of 3 bars. The temperature prevailing inside the multiphase flow tube is maintained at 130° ± 5° C. by a silicone bath. The reaction tube terminates in a separation vessel in which the substantially anhydrous dispersion is stirred for an average residence time of from about 4 to 8 minutes at a temperature of 70° C. and under a pressure of 20Torr. The separation vessel is connected to a distillation bridge and through a pump to another vessel for removal of the product.

The finely divided 20% dispersion of polyhydrazodicabonamide in the polyether thus obtained has a viscosity of 2460 cP at 25° C.

EXAMPLE 15

Continuous production of a 10% polyhydrazodicarbonamide/polymethylene urea dispersion in a branched polyether by simultaneous polyaddition and polycondensation.

Ratio PHD: polymethylene urea = 1:1.

Formulation

Storage vessel B1 contains a mixture of:
6770 parts, by weight, of a trimethylol propane-started polyether of propylene oxide and ethylene oxide (OH-number 31;
70% of primary OH-groups) as dispersant;
90 parts, by weight, of hydrazine monohydrate (99%);
600 parts, by weight, of a 50% aqueous urea solution;
20 parts, by weight, of 85% phosphoric acid and
11 parts, by weight, of 1 N sodium hydroxide.
Storage vessel B2 contains
310 parts, by weight, of diisocyanate T 80.
Storage vessel B3 contains
450 parts, by weight, of a 37% aqueous formaldehyde solution.

Table

| Storage vessel | Delivery (parts, by weight/minute) | Temperature (° C) |
|---|---|---|
| B1 | 74.54 | T1 = 90–100 |
| B2 | 3.08 | T2 = 20 |
| B3 | 4.46 | T3 = 20 |

Reaction Conditions

The procedure is substantially the same as in Example 14. The components from B1 to B2 are mixed in a first static mixer, the diisocyanate polyaddition reaction beginning. Immediately thereafter, the formaldehyde solution from B3 is coaxially introduced into the centre of the through-flowing reaction mixture in a following mixer. The initial pressure in the reaction flow tube amounts to from 2 to 3 bars, the temperature of the silicone bath amounts to from 120° to 130° C. and the temperature of the separation vessel amounts to from 90° to 110° C. A vacuum of from 10 to 12 Torr is applied to the separation vessel.

The anhydrous table 10% dispersion has a viscosity of 1040 cP at 25° C.

EXAMPLE 16

The reaction components are stored in two storage vessels B1 and B2. B1 contains a mixture of 800 parts, by weight, of the polyether of Example 14, 104 parts, by weight of an aliphatic diamine sulphonate corresponding to the following formula:

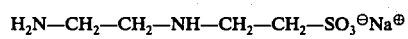

$$H_2N-CH_2-CH_2-NH-CH_2-CH_2-SO_3^\ominus Na^\oplus$$

and 127 parts, by weight, of water; B2 contains 96 parts, by weight, of the diisocyanate of Example 13. The delivery rate per minute amounts to 103.1 g for B1 and 9.6 g for B2, giving a total delivery rate of 112.7 g/minute.

The mixture heated to 95° C. in B1 is coaxially combined (residence time approximately 1.1 second) with the diisocyanate from B2 maintained at 20° C. by means of a twin piston pump in a static mixer (diameter ¼ inch; 21 elements; volume approximately 3 ml) and delivered under an initial pressure of 2 bars into the reaction tube in which the reaction mixture is maintained, by external heating (silicone Bath) at 110° C. ± 5° C. The reaction product is after-treated in the same way as in Example 14. The finely divided dispersion of the polyhydrazodicarbonamide in the polyether thus obtained has a viscosity of 2050 cP at 25° C.

What is claimed is:
1. A continuous process for the production of polyisocyanate-polyaddition products by reacting starting reaction components (A) polyisocyanates with (B) compounds containing at least two isocyanate-reactive groups in the presence of a material selected from the group consisting of organic solvents or dispersants, inert carrier gases, and mixtures thereof, comprising
   (1) introducing the liquid mixture of the starting reaction components, in the form of a solution or dispersion or with an inert carrier gas, into a coil flow tube having an internal diameter of from 3 to 100 mm, a ratio of tube diameter to tube length of from 1:100 to 1:3,000 and a ratio of tube diameter to coil diameter of from 1:5 to 1:100, the fall in pressure over the length of the reaction tube amounting to from 10 mbars to 100 bars, the quantitative ratios of starting reaction components, solvents or dispersants, and inert carrier gas being selected in such a way that the proportion of the total gas phase in the reaction tube amounting to from 10 to 90%, by weight, the rate of gas flow in the tube amounting to from 20 to 300 meters/second and the average residence time of the reacting starting components in the tube amounting to less than 5 minutes; directly dissipating the generated heat of reaction through the tube jacket which is coolable or heatable in sections, so that the reaction temperature is from 20° to 250° C.;

(2) removing the solid and/or liquid reaction product, and the inert carrier gas and/or vapor-formed solvent or dispersant at the end of the reaction tube.

2. The process of claim 1 wherein compounds selected from the group consisting of the starting reaction components, the solvent or dispersant, and the inert carrier gas, are introduced into the coiled flow tube at several points thereof.

3. The process of claim 2, wherein a prepolymer containing isocyanate groups is produced in the first part of the reaction tube by reacting an excess of organic polyisocyanates with a compound containing at least two Zerewitinoff-active hydrogen atoms and having a molecular weight of from 400 to 10,000 and the thus-produced prepolymer is cross-linked in the second part of the reaction tube by adding water and/or a chain-extender containing at least two Zerewitinoff-active hydrogen atoms and having a molecular weight of from 32 to 400.

4. The process of claim 1, wherein, before introduction into the reaction tube, the reaction components are pre-reacted up to a conversion of from 10 to 80% and this pre-reacted reaction mixture is then introduced into the reaction tube, optionally with the addition of further reaction components.

5. The process of claim 4, wherein the preliminary reaction is carried out in batches in a stirrer-equipped vessel.

6. The process of claim 4, wherein the preliminary reaction is carried out continuously in a reaction tube.

7. The process of claim 4, wherein a prepolymer containing isocyanate groups is prepared in the preliminary reaction stage.

8. The process of claim 4, wherein a prepolymer containing hydroxyl groups is prepared in the preliminary reaction stage.

9. The process of claim 1 wherein the polyisocyanate-polyaddition reaction is promoted with the use of a catalyst.

10. The process of claim 1 wherein the process also comprises the use of water.

11. The process of claim 1 wherein polyisocyanates are reacted in situ with substantially equivalent quantities of amino functional compounds in the presence of compounds containing at least 2 hydroxyl groups and having a molecular weight of from 400 to 10,000 as dispersant, and additionally in the presence of compounds selected from the group consisting of water, an organic solvent having a boiling point of from 30 to 250° C., an inert gas, or mixtures thereof.

* * * * *

UNITED STATES PATENT AND TRADEMARK OFFICE
Certificate

Patent No. 4,119,613     Patented October 10, 1978

Artur Reischl, Henning Klussmann & Eugen Velker

Application having been made by Artur Reischl, Henning Klussmann and Eugen Velker, the inventors named in the patent above identified, and Bayer Aktiengesellschaft, Leverkusen, Germany, a corp. of Germany, the assignee, for the issuance of a certificate under the provisions of Title 35, Section 256, of the United States Code, deleting the name of Eugen Velker as a joint inventor, and a showing and proof of facts satisfying the requirements of the said section having been submitted, it is this 28th day of April 1981, certified that the name of the said Eugen Velker is hereby deleted from the said patent as a joint inventor with the said Artur Reischl and Henning Klussmann.

FRED W. SHERLING,
*Associate Solicitor.*